US012715810B2

(12) United States Patent
Koster et al.

(10) Patent No.: US 12,715,810 B2
(45) Date of Patent: Aug. 25, 2026

(54) INDUSTRIAL FLUIDS WITH DILUTION RESISTANCE AND TUNABLE VISCOSITY, AND METHODS OF MAKING AND USING INDUSTRIAL FLUIDS

(71) Applicant: BLUE NOSE TECHNOLOGIES LLC, Centennial, CO (US)

(72) Inventors: Nicolas A. Koster, Denver, CO (US); Darrell Dous, Rimbey (CA); Anthony Manning, Calgary (CA)

(73) Assignee: BLUE NOSE TECHNOLOGIES LLC, Centennial, CO (US)

( * ) Notice: Subject to any disclaimer, the term of this patent is extended or adjusted under 35 U.S.C. 154(b) by 0 days.

(21) Appl. No.: 19/096,272

(22) Filed: Mar. 31, 2025

(65) Prior Publication Data

US 2025/0230096 A1 Jul. 17, 2025

Related U.S. Application Data

(63) Continuation of application No. 16/601,473, filed on Oct. 14, 2019, now Pat. No. 12,264,103, which is a (Continued)

(51) Int. Cl.

*C04B 22/06* (2006.01)
*C04B 24/00* (2006.01)
(Continued)

(52) U.S. Cl.

CPC .......... *C04B 22/064* (2013.01); *C04B 24/008* (2013.01); *C04B 24/02* (2013.01); (Continued)

(58) Field of Classification Search

CPC ..... C04B 22/064; C04B 24/008; C04B 24/02; C04B 26/04; C04B 28/02; C04B 28/10; C09K 8/03; C09K 8/426; C09K 8/44; C09K 8/467; C09K 15/06; C09K 15/08; E21B 33/13

See application file for complete search history.

(56) References Cited

U.S. PATENT DOCUMENTS 2,512,716 A * 6/1950 Courtney .............. C04B 24/302 524/596
7,134,497 B1 11/2006 Chatterji et al.
(Continued)

FOREIGN PATENT DOCUMENTS

WO 2014169389 A1 10/2014

OTHER PUBLICATIONS

Ecobust Distribution International Inc., "Material Safety Data Sheet: Ecobust (expansive demolition agent)," Revision 2008, 2 pages.
(Continued)

*Primary Examiner* — Crystal J Lee
(74) *Attorney, Agent, or Firm* — Dorsey & Whitney LLP

(57) ABSTRACT

Compositions and methods for sealing a leak in a well may include a phenolic curable resin. The leak may be sealed by deploying a mixture of water and a phenolic curable resin into the well, wherein the resin polymerizes and hardens at and around the leak in the well. The well may be an oil, gas, or geothermal well.

20 Claims, 2 Drawing Sheets

Related U.S. Application Data continuation of application No. 15/522,495, filed as application No. PCT/US2015/057607 on Oct. 27, 2015, now Pat. No. 10,442,731.

(60) Provisional application No. 62/069,076, filed on Oct. 27, 2014.

(51) Int. Cl.

| | |
|---|---|
| ***C04B 24/02*** | (2006.01) |
| ***C04B 26/04*** | (2006.01) |
| ***C04B 28/02*** | (2006.01) |
| ***C04B 28/10*** | (2006.01) |
| ***C04B 103/00*** | (2006.01) |
| ***C04B 111/00*** | (2006.01) |
| ***C04B 111/23*** | (2006.01) |
| ***C09K 8/03*** | (2006.01) |
| ***C09K 8/42*** | (2006.01) |
| ***C09K 8/44*** | (2006.01) |
| ***C09K 8/467*** | (2006.01) |
| ***C09K 15/06*** | (2006.01) |
| ***C09K 15/08*** | (2006.01) |
| ***E21B 33/13*** | (2006.01) |

(52) U.S. Cl.

CPC .............. *C04B 26/04* (2013.01); *C04B 28/02* (2013.01); *C04B 28/10* (2013.01); *C09K 8/03* (2013.01); *C09K 8/426* (2013.01); *C09K 8/44* (2013.01); *C09K 8/467* (2013.01); *C09K 15/06* (2013.01); *C09K 15/08* (2013.01); *E21B 33/13* (2013.01); *C04B 2103/0049* (2013.01); *C04B 2103/0062* (2013.01); *C04B 2111/00706* (2013.01); *C04B 2111/23* (2013.01)

(56) References Cited

U.S. PATENT DOCUMENTS

| | | | | |
|---|---|---|---|---|
| 7,762,329 | B1 * | 7/2010 | Morgan ................ | C09K 8/506 166/295 |
| 2003/0121662 | A1 | 7/2003 | Bosma et al. | |
| 2006/0122071 | A1 | 6/2006 | Reddy et al. | |
| 2008/0135251 | A1 | 6/2008 | Nguyen et al. | |
| 2010/0186956 | A1 | 7/2010 | Morgan et al. | |
| 2012/0328377 | A1 | 12/2012 | Brenneis et al. | |
| 2013/0130947 | A1 | 5/2013 | Brannon et al. | |
| 2015/0299457 | A1 * | 10/2015 | Fu ........................ | H05K 7/2039 428/35.8 |
| 2017/0247296 | A1 * | 8/2017 | Salla ....................... | C04B 26/02 |
| 2017/0247598 | A1 * | 8/2017 | Kennedy ............... | C04B 28/021 |

OTHER PUBLICATIONS

Dexpan Canada, "The easy way to break rock & concrete without blasting!", downloaded Sep. 2014, 2 pages.

Patents Office of the Gulf Cooperation Council for the Arab States of the Gulf GCC, "First examination report," including English Translation, dated May 24, 2018 in connection with Gulf Cooperation Council Application No. 127928, 8 pages.

Liangang "Material Safety Data Sheet: Expansive Mortar," Chemical China Co., Ltd.m Sep. 1, 2006, 4 pages.

U.S. Patent and Trademark Office, "PCT International Search Report & Written Opinion," mailed Feb. 19, 2016, for PCT Application No. PCT/US2015/057607, 12 pages.

Pusch et al., "Sealing of investigation boreholes, Phase 4: Final Report," Swedish Nuclear Fuel and Waste Management Co., Sep. 2011, 51 pages.

Séguin, "Material Safety Data Sheet: Dexpan," KMK Regulatory Services Inc., issued Mar. 1, 2010, 9 pages.

* cited by examiner

INDUSTRIAL FLUIDS WITH DILUTION RESISTANCE AND TUNABLE VISCOSITY, AND METHODS OF MAKING AND USING INDUSTRIAL FLUIDS

CROSS-REFERENCE TO RELATED APPLICATIONS

This application is a continuation of U.S. patent application Ser. No. 16/601,473, filed Oct. 14, 2019, entitled "Industrial Fluids With Dilution Resistance and Tunable Viscosity, and Methods of Making and Using Industrial Fluids," which is a continuation of U.S. patent application Ser. No. 15/522,495 filed Apr. 27, 2017, now U.S. Pat. No. 10,442,731, entitled "Industrial Fluids With Dilution Resistance and Tunable Viscosity, and Methods of Making and Using Industrial Fluids," which is a U.S. National Stage filing of International Patent Application No. PCT/US2015/057607, filed Oct. 27, 2015, entitled "Industrial Fluids With Dilution Resistance and Tunable Viscosity, and Methods of Making and Using Industrial Fluids," and claims benefit of priority pursuant to 35 U.S.C. § 119(e) to U.S. Provisional Patent Application No. 62/069,076, filed on Oct. 27, 2014, entitled "Industrial Fluids with Dilution Resistance and Tunable Viscosity, and Methods of Making and Using Industrial Fluids," the contents of each which are hereby incorporated by reference in their entirety.

FIELD

The disclosed compositions, processes, methods, and systems are directed to industrial fluids for use in diverse applications including oil and gas drilling/exploration and mining. The disclosed compositions include a calcium containing fluid and a modifying agent for altering the calcium-containing fluid's viscosity.

BACKGROUND

Many industries rely on fluids for lubrication, transport, pressure support, and other tasks. In some cases, a fluid may be relied on to perform more than one task at a time. For example, in oil and gas, geothermal and water drilling fluids help lubricate the drilling process, transport cuttings to the surface, reduce mixing with fluids (e.g. groundwater), and stabilize the wellbore. Drilling fluid (or drilling mud) often must be designed to perform these functions simultaneously.

A ready reserve of drilling fluid is required to add to the existing fluid as the wellbore is extended and to replace fluid that flows away from the wellbore. Significant amounts of fluid may be lost when the wellbore traverses fractured, permeable, or porous formations (loss formations or zones). In these cases, in addition to providing pressure support and transporting cuttings to the surface, the drilling fluid may be required to help stem the flow of fluid into the loss zone. In cases of significant loss, solids may be added to the drilling fluid to aid in blocking the flow of drilling fluid out of the wellbore and into the loss zone.

Drilling fluids commonly contain some materials or compounds that aid in creating a low permeability barrier on the walls of the wellbore. This is intended to prevent fluid from leaking out of the wellbore as well as external fluids from leaking into the wellbore. In the case of porous or fractured formations, the loss of fluid may be significant-sufficient to cause the wellbore to collapse. In these cases, additional materials may be required to prevent fluid loss. The added materials usually have a diameter that is similar in size or larger than the pore diameter (or the width of any openings such as fissures or fractures) of the formation being drilled. These materials are typically referred to as lost circulation materials, or LCMs. LCMs are usually inexpensive bulk additives that may be added to a wellbore, via the drilling fluid, in order to remediate fluid loss. Typical LCM's are in the form of flakes (or laminates), granules, or fibers (natural and synthetic). Where fissures, fractures, or voids have a large diameter, it may be difficult to remediate fluid loss with traditional LCMs, as their diameters may be too small to properly seal the fissures, fractures, or voids and prevent fluid loss from the wellbore. In these cases, it may be necessary to replace the drilling fluid with a cement mixture to stabilize the formation. However, this requires significant expenditures in both lost drilling time, specialized contractors and added materials. In some cases, when the drilling fluid cannot be properly replaced with a cement mixture, or is not replaced in sufficient time, the wellbore may collapse or be abandoned as unworkable.

Wellbores may require placement of temporary or permanent plugs or barriers. In some cases, wells are abandoned when they reach the end of their useful life, or where the wellbore is unproductive. In those instances, plugs are placed within the borehole to prevent migration of gas or fluids between the different formations and/or to the surface. Those plugs may be permanent or temporary. In addition, temporarily plugging a wellbore may be useful for the purpose of directional drilling and for sealing off formations. For directional drilling, a temporary plug is created in the wellbore to aid in creating the turn radius. In most cases, temporary plugs are designed so that they can be re-drilled later, if necessary.

Permanent plugs are useful where a wellbore is abandoned or where the operator wishes to prevent further use of the wellbore. Regulations in some jurisdictions may require plugging wells before they are abandoned. In the U.S., plugging and abandonment regulations vary between states, but numerous unplugged wells exist today. In most cases, cement is used to plug wells.

Expansive mortars are calcium-containing fluid compositions that may be used in place of explosive or mechanical methods for demolition and detachment of rock. Expansive mortars are created by mixing water with an expansive powder, which includes calcium oxide and various other oxides. Expansive powders may also include various carbonates, and/or salts. Immediately after mixing, expansive mortars are fluid, allowing them to be poured into holes created (or existing) in the target rock or structure. In most embodiments, expansive mortars are slow-acting, but exert significant force. However, because of the fluidity of expansive mortars, they are generally restricted to applications where holes are vertical, or the hole can be physically plugged to prevent the fluid mortar from leaking out.

SUMMARY

Therefore, compositions that comprise modified expansive mortars, or expansive mortars in combination with one or more agents, that are suitable for use in wellbores and other applications to remediate fluid loss, are useful.

In various aspects, the present disclosure is directed to methods of creating a fluid with enhanced viscosity, comprising contacting a fluid with a calcium product to create a calcium-fluid mixture, contacting a modifying agent to the calcium-fluid mixture, and allowing the modifying agent to react with the calcium product, wherein the reaction creates an enhanced viscosity fluid. In various aspects, the disclosed modifying agent comprises a polymer, a hydrocarbon, an alcohol and a salt, in some embodiments the polymer is a cross-linkable polymer that creates a water absorbing gel. In one embodiment, the polymer is polyacrylamide the hydrocarbon is one or more petroleum distillates, and the salt is selected from sodium chloride, ammonium chloride, and combinations thereof.

In various other aspects, the present disclosure is directed to methods of creating an enhanced-viscosity fluid, comprising, contacting a drilling fluid with a calcium product, wherein the calcium product comprises calcium oxide, and an oxide selected from sulphur oxide, silicon oxide, magnesium oxide, aluminum oxide, iron oxide and combinations thereof, to create a calcium-fluid mixture, contacting a modifying agent with the calcium-fluid mixture, transferring the modifying agent-calcium-fluid mixture into a borehole, and allowing the modifying agent-calcium-fluid mixture in the borehole to increase in viscosity, wherein an enhanced-viscosity fluid is generated.

In still other aspects, the present disclosure is directed to methods of creating a plug for a wellbore, comprising, contacting a drilling fluid with a powdered calcium product, wherein the calcium product comprises calcium oxide, and an oxide selected from sulphur oxide, silicon oxide, magnesium oxide, aluminum oxide, iron oxide and combinations of the foregoing, to create a calcium-fluid mixture, contacting a modifying agent to the calcium-fluid mixture to create a modifying agent-calcium-fluid mixture, contacting the modifying agent-calcium-fluid mixture with a curable polymer to the modifying agent-calcium-fluid mixture and mixing, pumping the resulting mixture into a borehole, and allowing the resulting mixture to solidify, thereby creating a plug for the borehole.

In still other aspects, the present disclosure is directed to methods of creating an expansive putty, comprising, contacting a calcium oxide containing expansive mortar powder with a fluid, wherein the calcium product comprises calcium oxide, and an oxide selected from sulphur oxide, silicon oxide, magnesium oxide, aluminum oxide, iron oxide and combinations of the foregoing, to create an expansive mortar, contacting a modifying agent to the expansive mortar to create a modifying agent-expansive mortar, and allowing the modifying agent-expansive mortar to react and increase in viscosity, thereby creating an expansive putty. A method of claim 4, wherein the ratio of calcium product to fluid is between 5 kg: 1.0 L and 5 kg: 1.9 L.5.

In still further aspects, the present disclosure is directed to composition for enhancing the acid resistance of a concrete product comprising: phenol, formaldehyde, and water, wherein the molar ratio of phenol to formaldehyde is greater than 1, for example about 10, or where the amount of phenol is less than about 17% and the amount of formaldehyde is less than about 1.7%. Also disclosed, is a method of enhancing the acid resistance and/or compressive strength of a concrete product comprising, combining a dry cement with fluid to create a cement mixture, mixing the cement mixture, pouring the cement mixture into a form or structure, and allowing the cement mixture to harden over time, wherein the cement mixture comprises phenol and formaldehyde, wherein the fluid comprises phenol and or formaldehyde, or wherein a resin comprising formaldehyde and phenol is added to the cement mixture before or during the mixing step, or the formaldehyde and phenol are added to the cement mixture before or during the mixing step. In many embodiments, the compressive strength and/or acid resistance of the cement product is enhanced without significant increase in its density.

In still further aspects, the present disclosure is directed to a method of at least partially sealing a leak in a well comprising, adding a resin to the backside of a tubing string, pumping the resin into the leak, allowing the resin to polymerize; and thereby sealing the leak in the tubing string, wherein the resin is a curable resin, or a phenolic resin comprising phenol and formaldehyde in molar ratio greater than 1, or about 10, or wherein the resin comprises phenol at less than about 17% and formaldehyde at less than about 1.7%. In some aspects, the disclosed method may include measuring the backside pressure in the well, after sealing the leak, at greater than about 50 psi.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

DETAILED DESCRIPTION

Figure 1:
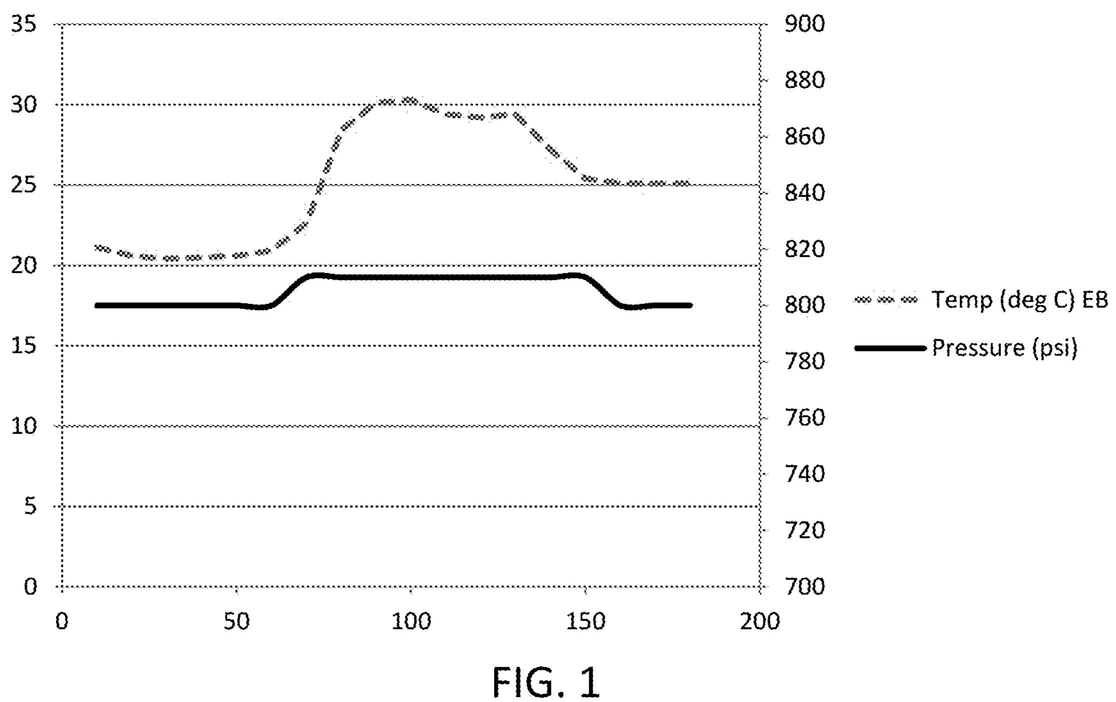
FIG. 1 shows pressure and temperature of a sample of enhanced viscosity fluid as a function of time, post-mixing as described in Example 1.

LCM/Mud—As set forth in greater detail below, disclosed herein are compositions, methods, processes, and systems for modifying the viscosity of a variety of calcium containing fluids. In various aspects, a modifying agent is put into contact with one or more calcium-containing fluids in order to modify the viscosity of the fluid(s). In some embodiments, the modifying agent serves to increase the viscosity of one or more calcium-containing fluids.

In various aspects, the modifying agent comprises a polymer, an alcohol, and an aliphatic compound. The modifying agent, when added to a calcium containing fluid, alters the viscosity of the fluid. In some embodiments, the modifying agent serves to increase the viscosity of the calcium containing fluid. In some embodiments, the modifying agent may be added to a drilling fluid or mud that contains calcium oxide. In some embodiments, the calcium containing fluid is a drilling fluid replacement. The calcium oxide may be present in the drilling fluid or mud naturally, or may be added to the drilling fluid or mud. In some embodiments, the calcium oxide is added to the drilling fluid or mud prior to addition of the modifying agent. In some embodiments, the calcium oxide is added to the drilling fluid or mud concurrently with the modifying agent. In some embodiments, the calcium oxide is added to the drilling fluid or mud after the modifying agent has been added to the drilling fluid or mud.

The modifying agent may aid in altering the viscosity of the drilling fluid or other calcium containing fluid such that the fluid itself acts similarly to a lost circulation material, preventing or slowing loss of drilling fluid through a porous, permeable, or void-bearing formation, but without some of the drawbacks associated with LCMs. In that respect, the modifying agent may, in some embodiments, serve to increase the viscosity of the drilling fluid such that when the modified drilling fluid contacts a pore or void in a formation, its viscosity either prevents it from passing into a pore or void or significantly reduces the rate at which the modified drilling fluid moves into a pore or void. In some embodiments, the modifying agent is added to drilling fluid in an amount that is sufficient to increase its viscosity to the point where there is no loss of drilling fluid through a porous, permeable, or void-bearing formation. In various aspects, there is no decrease in efficiency of the drilling operation caused by the increased viscosity of the drilling fluid.

In some embodiments, other compounds, in addition to calcium oxide, may be in or may be added to the calcium containing fluid in addition to the modifying agent. In some embodiments, an expansive mortar powder, comprising calcium oxide and other compounds, may be added to the a fluid, to create a calcium containing fluid. In some embodiments, the other compounds and/or the expansive mortar powder is added to the drilling fluid prior to addition of the modifying agent. In some embodiments, the other compounds and/or the expansive mortar is added to the drilling fluid concurrently with the modifying agent. In some embodiments, the other compounds and/or the expansive mortar is added to the drilling fluid after the modifying agent has been added to the drilling fluid.

Plug (temporary and permanent)—As set forth in greater detail below, in various aspects, the disclosed modifying agents may also be combined with a resin which, when added to a drilling fluid comprising calcium oxide, form a plug that can temporarily block a borehole. In some embodiments, the amount of modifying agent and resin may be increased to generate a more permanent block or plug. Therefore, by varying the amount of modifying agent combined with resin, the strength and degree of permanence of the plug generated can be varied.

Expansive Putty—As set forth in greater detail below, in various aspects, the disclosed modifying agents may also be combined with calcium containing expansive mortars to create an expansive putty or a semi-solid putty. Many known expansive mortars are calcium-containing liquids. When such expansive mortars are combined with one or more of the disclosed modifying agents, the modifying agents alter the viscosity of the liquid mortar to create an expansive putty or a semi-solid, expansive putty. This allows the expansive mortar to be used in applications where use of a fluid expansive mortar would be impossible or impractical including, for example, in water (including either partially or fully submerged applications) or in spaces where a fluid may leak out.

Enhanced-Viscosity Fluids

In various aspects, compositions and methods provided by the present disclosure may be used to increase the viscosity of a fluid, for example a drilling fluid, to generate an enhanced-viscosity fluid. In drilling applications, the enhanced-viscosity fluid may be delivered to a target formation, such as a porous or fractured formation, in order to prevent and/or reduce the loss of drilling fluid from the formation. Production of enhanced-viscosity fluids by combining the disclosed calcium products and modifying agents, as described herein, has several advantages over the use of traditional lost circulation materials (LCMs), such as fibrous, flaky, or granular materials. First, the timing of initiation of the set up or generation of the enhanced-viscosity fluid may be delayed, which aids in the delivery of the enhanced-viscosity fluid to a given target formation. This may be particularly advantageous for deep formations, where it is desirable to deliver an enhanced-viscosity fluid to a location far below the ground, while not exposing formations closer to the surface to the enhanced-viscosity fluid. Second, the enhanced-viscosity fluid may be designed to set up over a selected period of time, which allows the fluid to diffuse into the target formation, prior to sealing off the formation. This may be particularly advantageous for use in highly porous formations, where the fluid may be allowed to penetrate the formation to a desired degree before setting up as an enhanced-viscosity fluid, at which point it acts to prevent and/or reduce the loss of drilling fluid from the formation. Finally, the enhanced-viscosity fluid is not permanent, and unlike LCMs, can be configured to revert to a powder over time, which will allow the enhanced-viscosity fluid to be removed from the borehole.

In various aspects, the drilling fluid for use with the disclosed methods contains calcium oxide, and, in some embodiments, may contain one or more additional compounds to aid in controlling heat generation and viscosity. With the addition of the modifying agent, the user has the ability to change the viscosity of the calcium containing drilling fluid. By varying the amount of modifying agent added to the calcium-containing drilling fluid, the user may change the viscosity of the drilling fluid, as well as the timing of the reaction. In some cases a more or less rapid reaction, or a greater or lesser delay is desired. In drilling applications, addition of the modifying agent in such a way as to rapidly change the viscosity of the drilling fluid enables the drilling fluid and mud system to rapidly compensate for fluid losses due to high conductivity (such as, for example, fracture networks, etc.). Surprisingly, the increase in viscosity is accomplished without significant changes in the weight and/or density of the drilling fluid/mud system. Reaction times (delay and setup) and temperatures can be controlled by the user through selection of one or more calcium products and/or calcium oxide formulations that are added to the drilling fluid and modifying agent. The calcium products may be selected, in some embodiments, to increase the time in which the enhanced-viscosity fluid is generated and, in other embodiments, to delay the set up or generation of the enhanced-viscosity fluid for a desired period of time. In some embodiments, as described below, expansive mortar powders may be used as a calcium product to create a calcium-containing fluid, by adding the expansive mortar powder either directly to a drilling fluid or to water to create a drilling fluid replacement. In some cases, the expansive powder can be added directly to the drilling fluid, or to a combination of drilling fluid and modifying agent. In many cases, the expansive mortar powders display different physical and/or chemical characteristics based on the temperature at which they are used. Thus, in some embodiments the reaction rates, or the rates at which the enhanced-viscosity fluids are generated, may be selected based on the calcium product(s) chosen. In some embodiments, the viscosity of the enhanced-viscosity fluids can be controlled based on the amount of modifying agent added to the drilling fluid and the overall combined amount of calcium product and modifying agent added to the drilling fluid/mud system.

Calcium oxide (CaO, quicklime, or hotlime) is typically used in the oil and gas industry to assist in emulsification of oil-based drilling muds. The conversion of calcium oxide to calcium hydroxide (or slaked lime) in the presence of water produces heat. This heat helps the emulsification process in drilling mud.

Calcium oxide is also a major ingredient of expansive mortars. Expansive mortars are typically used in demolition and mining applications in place of traditional explosives or physical methods (e.g. jackhammers), in order to avoid percussion and/or noise. Calcium oxide, in general, makes up greater than 80% of the inorganic compounds found in expansive mortars. The balance of the inorganic compounds includes other oxides (for example, silicon, aluminum, iron, magnesium and sulfur), carbonates (for example, calcium carbonate and sodium carbonate), and salts. In some cases, the expansive mortar powders do not contain organic compounds. Expansive mortars may also include other compounds, which may allow for more predictable, dependable, and aggressive heat generation or reaction characteristics in standard applications.

Disclosed herein are methods for altering the viscosity of calcium-bearing fluids, for example drilling fluids. In one embodiment, a modifying agent is added to a calcium-containing drilling fluid to produce an enhanced-viscosity fluid, which is a drilling fluid with increased viscosity. Increasing the viscosity of a drilling fluid may enhance wellbore drilling in many ways. In one embodiment, the enhanced-viscosity fluid may be used to control the flow of drilling fluid out of the wellbore into a fractured, porous, or vugular formation. In some embodiments, the enhanced-viscosity fluid performs the function of a lost circulation material or LCM to inhibit or prevent flow of drilling fluid into the surrounding formation. In such embodiments, it is the drilling fluid itself, in the form of an enhanced-viscosity fluid, that controls its own rate of flow into the surrounding formation.

The modifying agent may comprise polymers, alcohols, petroleum distillates, and salts. In some embodiments, the polymers, alcohols, petroleum distillates, and salts are found in oilfield formulations where they are typically used to mitigate friction. Addition of the modifying agent helps to increase the viscosity of a calcium containing fluid, such as a drilling mud.

In embodiments of the methods disclosed herein, the addition of a liquid modifying agent to calcium containing drilling fluid (mud), simplifies the control of loss formations or loss zones by generating an enhanced-viscosity fluid that serves to reduce or eliminate its own rate of loss from the drilling formation. The resulting enhanced viscosity drilling fluid also resists dilution, for example in water or other solvents.

The viscosity of the enhanced viscosity fluid may be selected over a range from Newtonian to non-Newtonian fluids. In some embodiments, the enhanced-viscosity fluid has a viscosity of from about 1.0 cP to about 30 cP (cP centipoise; as measured on an OFITE 900 Viscometer, additional info available at manufacturer's website www.ofite.com/products/130-76-C.asp]. In some embodiments, the viscosity may develop over time after addition of the modifying agent, for example the initial viscosity may be about 22 cP and may increase to about 26 cP after about 1 hour of incubation.

The disclosed methods avoid the addition and eventual removal of solid LCM's from the drilling mud and/or from a producing formation. This is due to the properties or characteristics of the reaction products formed by the interaction of the calcium-containing fluid and the modifying agent, which disintegrate/dissolve over time. This is in contrast to solid LCMs, which do not disintegrate or dissolve over time and must be removed from a producing formation after use.

In some embodiments, the fluid comprises a dilute expansive mortar containing calcium oxide. In many cases the expansive mortar powder contains other oxides (including dioxides and trioxides) including sulfur, silicon, magnesium, iron, aluminum, and combinations thereof, it may also contain carbonates including calcium and sodium, and salts. In various cases, a modifying agent is added to the dilute expansive mortar, which is then used as a drilling fluid replacement.

In other embodiments, the fluid is a drilling mud comprising a quantity of calcium oxide. The calcium oxide may be added to the drilling fluid by addition of raw calcium oxide or a calcium oxide-containing mixture. In some embodiments the calcium oxide-containing mixture is an expansive mortar, which may contain other oxides (including dioxides and trioxides) including sulfur, silicon, magnesium, iron, aluminum, and combinations thereof, it may also contain carbonates including calcium and sodium, and salts.

In some embodiments, the calcium is added to the drilling fluid directly and mixed to disperse the calcium. In some embodiments, the calcium may be hydrated prior to combining with the drilling fluid to create a calcium-fluid mixture. In some embodiments, a modifying agent is added and the calcium-drilling fluid-modifying agent mixture is further mixed to allow for dispersion of the calcium and modifying agent throughout the drilling fluid. In some embodiments, the viscosity of the calcium-drilling fluid-modifying agent mixture (cPMin) does not initially differ significantly from the viscosity of the calcium-drilling fluid mixture (cPcal). In such embodiments, the initial viscosity of the calcium-drilling fluid-modifying agent mixture is initially similar to that of drilling fluid alone, but then increases over time to a maximum desired viscosity (cP-Max) that is based on the total amount of the calcium and modifying agent introduced. This time is referred to as a "setup" time. In some embodiments, the setup time may be about one-half, one, two, three or more hours, and may vary depending on the temperature of the fluid or fluid mixtures. In some embodiments, the setup time will increase with decreasing temperature and decrease with increasing temperature. Control of the setup time may allow the fluid to be prepared in one location and transferred or transported to another location.

In some embodiments, a calcium-containing product is hydrated prior to addition of the modifying agent. In such embodiments, about 0.5-5.0 g of calcium product is combined with about 1.0 ml of fluid. In other embodiments, about 1.0-2.0 g of calcium product is combined with about 1.0 ml of fluid.

The calcium product may be raw calcium oxide or may be a mixture of calcium oxide and other compounds. In some embodiments, the concentration of calcium oxide in the product is greater than about 60%, 65%, 70%, 75%, 80%, 90%, 95%, 96%, 97%, 98%, or 99%, and/or less than about 100%, 99%, 98%, 97%, 96%, 95%, 90%, 85%, 80%, 75%, 70%, or 65%. For example, between 60 and 100%, 70 and 95%, 80 and 95%. In some embodiments, the calcium product may comprise various oxide, dioxides, and trioxides, selected from magnesium, sulfur, aluminum, iron, silicon, and combinations thereof. In some embodiments, the calcium product may further include carbonates selected from calcium and/or sodium. In some embodiments, the calcium product may comprise various salts.

The calcium product may be a dry expansive powder mix. Expansive powder mixes are calcium-containing mixtures that expand and heat up when combined with water. In some embodiments, when combined with water at traditional ratios, expansive mortars may exert up to 20,000 psi of expansive force. Expansive mortars are used for mining and demolition where explosives, mechanical process, or excessive noise is prohibited. Traditionally, expansive mortars are created by combining about 11 pounds (about 5 kg) of the expansive powder with 0.4 gallons (about 1.5 L) of water. In the methods disclosed herein, where expansive powders are used for creating an enhanced-viscosity fluid, the amount of water used to hydrate the powder is increased. In some embodiments, the amount of water is increased in order to reduce the total amount of expansive force generated by the expansive powder. In many embodiments, wherein the expansive powder is used in drilling applications the amount of water is increased 2-fold, 3-fold, 4-fold, 5-fold, or more.

In some embodiments, the creation and use of an enhanced viscosity fluid begins by hydrating 11 lbs (5 kg) of expansive powder with about 1-3 gallons of drilling fluid. In some embodiments, the 11 lbs (5 kg) of expansive powder is hydrated prior to addition to the drilling fluid by combining the powder with about 1.0 gallon (about 3.7 L) of water, dispersing the powder to create a calcium-water mixture. In some embodiments, 11 lbs (5 kg) of expansive powder is then diluted in 1.0 gal (about 3.7 L) of water, and then combined with an equal volume of drilling fluid. In other embodiments, the 11 pounds of expansive powder is hydrated by combining it with 2.0 gallons (about 7.6 L) of drilling fluid, and mixing to disperse the powder. The expansive powder may be mixed with water and combined with the modifying agent to create the enhanced viscosity fluid. In other embodiments, the expansive powder is mixed with drilling fluid and combined with modifying agent to create the enhanced viscosity fluid. In still other embodiments, the expansive powder is mixed with water then added to drilling fluid, and then modifying agent is added to create an enhanced viscosity fluid. In still other embodiments, the expansive powder is mixed with water and combined with the modifying agent and then added to drilling fluid to create the enhanced viscosity fluid.

A variety of expansive powders may be used with the disclosed methods. In some embodiments, the expansive powder comprises between about 60-100% calcium oxide, between about 5-10% silica oxides, between about 1-5% iron oxides, and between about 1-5% aluminum oxides. In other embodiments the expansive powder comprises calcium oxide at about 82.56%, sodium carbonate at about 2.57%, sulphur trioxide at about 0.37%, silicon dioxide at about 5.96%, magnesium oxide at about 3.09%, aluminum oxide at about 2.21%, calcium carbonate at about 2.13%, and ferric oxide at about 1.11%. In still other embodiments, the expansive powder may comprise calcium oxide at about 83-96%, silicon dioxide at about 1.5-6%, aluminum oxide at about 0.3-5.0%, ferric oxide at about 0.2-3%, magnesium oxide at about 0-1.6%, and sulfur trioxide at about 0.6-2%. Each of the foregoing percentages represent percentages of the total expansive powder composition, by weight.

In various aspects, a modifying agent is added to a calcium-drilling fluid mixture in order to increase the viscosity of the drilling fluid and generate an enhanced-viscosity fluid. The modifying agent may comprise a polymer, petroleum distillates, alcohol, and salt. The polymer may be selected from various cross-linkable homo or hetero polymers, for example polymers with amino groups and or carboxyl groups. In some embodiments the polymer is hydrophilic polymer that, when cross-linked creates a gel. In one embodiment the polymer is a vinyl polymer, for example polyacrylamide. The concentration of polymer in the modifying agent may be about 40-80%. Petroleum distillates may be a single size, class, or type of hydrocarbon (including saturated and unsaturated hydrocarbons) or a mixture of various hydrocarbons, for example naphtha. In most embodiments, petroleum distillates are present in an amount of from about 5-35%. Various alcohols, including primary, secondary, and tertiary alcohols may be used in the modifying agent, in amounts from about 1-10%. Various salts may be added to the modifying agent, for example sodium and/or ammonium chloride, in amounts from about 1-10%. In one embodiment, the modifying agent comprises 65% polyacrylamide, 20% petroleum distillates, 5% alcohol, 5% sodium chloride, 5% ammonium chloride.

The modifying agent can be added to the calcium-drilling fluid mixture in various ratios in order to generate enhanced-viscosity fluids having varying viscosities, depending on the desired application and viscosity. In embodiments where an enhanced-viscosity fluid is generated for use in a drilling application in order to act as an LCM, about 0.25-3 ounces of modifying agent is added to about 2 gallons (7.6 L) of calcium-drilling fluid mixture. In some embodiments, the amount of modifying agent added to the mixture is based on the amount of calcium compound added, for example the ratio of modifying agent to calcium compound may be about 0.25-3 ounces (about 7-90 ml) per 11 pounds. In one embodiment, 2 oz (60 ml) of modifying agent is added per 11 lbs (5 kg) of calcium product, diluted in 1-3 gal (3.7-11.3 L). In some embodiments, the viscosity can be increased by increasing the amount of modifying agent added, and/or altering the ratio of powder to fluid, as desired by a user.

Demolition

Expansive mortars in the construction, mining, and demolition industries are very fluid, and tend to find and move to the lowest point in the application site, which may or may not be an optimal location for the expansive mortars. This limits their range of use to situations where the fluid can be contained, such as holes drilled in the top of a rock, so long as the mortar cannot escape the hole. In order to apply expansive force at the top of the hole, the entire hole must be filled with the expansive mortar. Thus, in order to deploy expansive mortars overhead, or within specific locations in a larger hole, physical containment of the mortar, e.g. barriers or plugs must be used. The fluid nature of expansive mortars also prevents their use underwater.

In various aspects, the addition of a modifying agent provided by the present disclosure to an expansive mortar creates a highly viscous, semi-solid gel or putty that allows the mortar to be used in overhead applications. In some embodiments, the expansive putty can support its own weight in a suspending application, or where the deployment hole is vertical. Moreover, these characteristics enhance the expansive force of the putty by concentrating and containing expansion, rather than allowing the mortar to flow out of the deployment site. Therefore, the addition of a modifying agent allows for use of a reduced amount of expansive mortar for an application than may otherwise have been necessary with a liquid mortar.

As disclosed herein, a calcium oxide-based expansive mortar can be hydrated prior to use. The viscosity of the hydrated mortar can then be altered by the addition of a modifying agent provided by the present disclosure, such that the physical property of the modified mortar is changed from a liquid to a non-Newtonian form selected from a fluid, putty, solid, or semi-solid, each having the ability to display variable viscosity. An expansive mortar comprising the disclosed modifying agent is referred to as an expansive putty, regardless of the viscosity of the resulting mixture. The viscosity of an expansive putty may be increased by increasing the amount of modifying agent added relative to the volume of expansive mortar prepared. In some embodiments, a large enough amount of modifying agent is added to an expansive putty to generate a dilution-resistant expansive putty mortar that is useful and effective for underwater deployment and/or for deployment sites exposed to flowing water. These characteristics, in addition to the increased concentration of expansive force, may allow the expansive putty to work on materials and in applications where traditional, fluid expansive mortars had little usefulness.

In some embodiments of expansive applications, an expansive powder is hydrated using less water than is used to generate an enhanced-viscosity fluid, disclosed above. In embodiments where greater viscosity is desired, an expansive powder mortar is hydrated at a rate of about 2.0-4.0 grams of powder per 1.0 milliliter of water. In one embodiment the ratio is about 3.3 g/ml, or 3.3 kg/litre. Typically, expansive powders are supplied in 11 pound (5 kg) aliquots—thus 11 lb (5 kg) of powder is hydrated in 0.4 gallons (1.5 L) of water.

The amount of modifying agent used to generate an expansive putty depends, in some embodiments, on the amount of expansive powder mortar that has been hydrated. For example, in some embodiments the ratio of modifying agent to powder is about 8-16 μl per 1.0 g powder. In some embodiments, 11 pounds of powder is hydrated in 0.4 gallons of water and then 2.0 ounces of modifying agent is added.

The temperature of the water may be altered to slow (cool water) or speed (warm-hot water) the reaction rate. In addition, different expansive powders may also be used to aid in controlling the reaction rates, for example some expansive powders react faster at low temperatures than other expansive powders. In some embodiments the water may be replaced with drilling fluid.

Some exemplary expansive powders for use with the presently claimed methods are: Dexpan (#1, #2, #3), Ecobust (Type 1, Type 2, Type 3, Type 4), CrackAG, Rock Frac, SPLITSTAR, Expando, Crackmax, Split-AG, Betopper, SCASTAR, and ExpanMortar.

Borehole Plug

Temporary Plugs—The modifying agents provided by the present disclosure may also be used to create temporary and permanent barriers, which may be used as plugs in various applications. For example, in drilling applications, boreholes may be permanently or temporarily plugged using plugs generated by the methods and compositions disclosed herein. In various aspects, the generation of temporary and/or permanent plugs comprises a curable resin added to a calcium-drilling fluid-modifying agent mixture provided by the present disclosure. In several embodiments, the amount of dry resin added to the mixture is calculated based on the amount of expansive mortar used, for example the amount of dry resin may be 5% to 100% of the weight of expansive mortar—thus the final composition of resin in the mixture is about 2.5-50% by weight.

In several embodiments, a plug may be created using the same mixtures and ratios described above for creation of enhanced-viscosity fluids. For example, 11 lbs of expansive powder may be hydrated with 1.0-3.0 gallons of fluid or water, as described herein. After dispersion of the powder, 1.0-3.0 ounces of modifying agent may be added to the hydrated powder. After dispersion of the modifying agent, a curable resin (for example, phenol-formaldehyde) is added and dispersed.

In some embodiments, the curable resin comprises phenol. In many embodiments the resin is a phenol resin comprising formaldehyde. In some embodiments, the molar ratio of phenol to formaldehyde in the resin is about 1, less than 1, or greater than one. In some embodiments, the molar ratio of phenol to formaldehyde is greater than 1, for example, 10:1. The phenolic resin may comprise about 25-10% phenol, or between 20-15% phenol. In many cases, the phenolic resin may comprise less than about 20%, 15%, 10%, or 5% formaldehyde, or less than about 3% formaldehyde. In some embodiments, the phenol may be less than about 20%, 19%, 18%, 17%, 16%, 15%, 14%, 13%, 12%, 11%, or 10% and greater than about 9%, 10%, 11%, 12%, 13%, 14%, 15%, 16%, 17%, 18%, or 19%. And the formaldehyde may be less than about 3.0%, 2.9%, 2.8%, 2.7%, 2.6%, 2.5%, 2.4%, 2.3%, 2.2%, 2.1%, 2.0%, 1.9%, 1.8%, 1.7%, 1.6%, 1.5%, 1.4%, 1.3%, 1.2%, 1.1%, or 1.0% and greater than about 0.9%, 1.0%, 1.1%, 1.2%, 1.3%, 1.4%, 1.5%, 1.6%, 1.7%, 1.8%, 1.9%, 2.0%, 2.1%, 22%, 2.3%, 2.4%, 2.5%, 2.6%, 2.7%, 2.8%, or 2.9%. In one embodiment, the resin may have a phenol to formaldehyde ratio that is about 10, and may comprise less than about 1.7% formaldehyde and less than about 17% phenol. In some embodiments, phenol and formaldehyde may be mixed to create the phenolic resin in the desired molar ratio and percentages.

The compressive strength of the plug, and thus its temporary or permanent nature, may be controlled by addition of the resin. In some embodiments, the resin is curable and may be activated at a target temperature. In one embodiment, the resin is cured at 120° F., such that the generation of a plug from the disclosed composition will not occur until the composition is heated to at least 120° F. In other embodiments, the target temperature may be greater than or less than about 120° F. The selection of a target cure temperature aids in preventing the resin from solidifying prior to reaching the target deployment site.

Compressive strength of the plug may be varied to suit a specific application, for example directional drilling initiated at the plug. In some embodiments, the compressive strength of the plug is generated to be similar to the compressive strength of the formation at the deployment site, for example brittle shale.

In some embodiments, the disclosed plugs may act as a cement alternative, for example in surface and intermediate casing and liners. In these embodiments, the plug material can be deployed via drilling, coil tubing, or workover rig, which may eliminate the need for a separate or dedicated cementing crew.

In the case of permanent, substantially non-drillable plugs, the amount of both modifying agent and curable resin is increased. Increasing these components may allow the permanent plug material to bind to the surrounding formation. In addition, the permanent plug material may create a solid barrier that is impermeable to gas and fluid. Here again, the plug material may be pumped through a drilling, coil tubing, or workover (service) rig's pump, as opposed to a dedicated cementing unit, although it can be pumped through a dedicated cementing unit also. In most cases, a solvent wash may be used to flush the pump system after the permanent plug material has been deposited at the deployment site.

In many embodiments, the borehole plug is impermeable to gas and may be used to comply with governmental standards relating to the amount of gas that may exit a plugged well.

Leak Mitigation

The phenolic resin disclosed herein may be used as a liquid sealant with delayed activation. In this embodiment, the resin is mixed with water (or other suitable fluid or solvent) to create a resin+water solution. When combined with an oxidizer, the resin may rapidly polymerize around a matrix of the oxidizer. The ratio of resin to water may be from about 1:10 to 1:1 to 10:1. In many embodiments, the ratio of resin to water is between about 1:5 to 2:1, for example 1:4 and 1:1.

In some embodiments, calcium oxide can be used as a matrix for the polymerized resin to bind. This binding may aid in increasing the strength and ductility of the final, reacted product. In many cases, the disclosed, liquid resin allows for more rapid polymerization than powdered phenolic resins. The disclosed resin may also aid in increasing both the compressive and shear strength of the final seal material.

The method of sealing the leak may include identifying and locating the leak, followed by deploying a oxidizer+water into and around the leak, deploying the phenolic resin, and allowing polymerization. In many cases, the location of presumed leaks in the casing of oil, gas, and geothermal wells are identified and isolated, using various techniques well known in the art. For example, water can be pumped through the system to confirm the ability to deploy the resin at the location of the leak and into the leak. In many embodiments, a constant fluid rate of an oxidizer+water mixture is first pumped through the leak position. This may aid in depositing the oxidizer product into the leak, as well as immediately behind it (in some cases, fluid loss through the surrounding reservoir may aid in depositing the oxidizer product in the near-leak region). After an amount of oxidizer product sufficient to seal the leak (which may be based on the size of the leak and the pressure/rate required to move fluid through the leak) is deployed, the liquid resin is pumped through the system so that it may contact the oxidizer positioned at and around the leak. In most cases, polymerization occurs when the resin contacts the deposited oxidizer product. The resulting polymerization product hardens, forming a barrier to fluids and gases that may be permanent. In most embodiments, polymerization occurs sufficiently fast enough that a noticeable increase in injection pressures can be measured. This increase may indicate successful mitigation of the leak.

In some cases, the method may not include deployment of an oxidizer+water mixture. In these embodiments, a suitable oxidizer may be a component of a drilling fluid, which has deposited sufficient amounts of the oxidizer at or near the leak.

The disclosed leak mitigation techniques and methods offer several advantages over existing products and methods. For example, the disclosed phenolic resin is water soluble, and therefore does not require clean-up with harsh or caustic solvents or other hazardous fluids. The disclosed phenolic resin can be diluted in water (or other appropriate solvent), allowing deployment/penetration through small holes/cracks/thread leaks, which may not be accessible with existing technologies.

Acid Resistant Materials

The phenolic resin disclosed herein may be used to enhance acid resistance of a material comprising one or more oxidizer materials. In one embodiment, the phenolic resin may be used to enhance the acid and/or corrosion resistance of a cement product. In these embodiments, the resin may be mixed with water (or other suitable solvent) to create a resin+water solution, and the solution added to the cement mixture.

Cement comprising phenolic resin may resist corrosion. In most cases, the cement is resistant to acid. In some embodiments, the resulting acid resistant concrete may resist corrosion when contacted by an acid compared to a cement product that does not comprise phenolic resin. In various embodiments, the cement comprising phenolic resin is between 20% and 90% more resistant to acid than a non-treated cement. Any appropriate test for measuring the acid resistance of a concrete product may be used, for example physical inspection of the cement surface (by micrograph, for example), measuring the depth of erosion of the cement's surface, weight, density, compressive strength, and other tests well known in the art.

In most embodiments, addition of the disclosed phenolic resin to a cement product enhances the compressive strength of the cement product. In some embodiments, for example, wherein a cement product is mixed with resin, the compressive strength of the resulting solid cement product may be increased greater than about 5% compared to cement lacking the phenolic resin. In some embodiments, compressive strength is enhanced greater than about 10%, 15%, 20%, or 25%, and less than about 30%, 25%, 20%, 15% or 10%. In various embodiments, the addition of between about 2% and 25% phenolic resin to a typical cement mixture used in oil and gas drilling, may result in enhanced compressive strength. In one embodiment, the addition of 15% phenolic resin (comprising less than 17% phenol and 1.7% formaldehyde) may enhance the compressive strength of the resulting solid cement product by greater than 10%, without a significant (i.e. greater than about 5% or 10%) increase in the density of the resulting solid cement product.

In many cases, acid resistant cement, with enhanced compressive strength may be used in oil and gas wells. As discussed above, the use of hazardous materials is not required to remove the disclosed phenolic resins, such as in the case where epoxy resins are used. In many cases, use of the disclosed phenolic resins offer superior control because the disclosed phenolic resins will cure upon contact with oxidizer (for example lime or other oxidizers in typical cement mixtures employed in the field of oil and gas).

EXAMPLES

Example 1—EB2 LCM/Mud Additive

An LCM/Mud Additive or enhanced viscosity fluid was created using EcoBust Type 2 ("EB-2"; working ambient temperatures between 50 and 77° F.). EB-2 powder was hydrated at a rate of 1.3 g of powder per 1.0 mL of fresh water. After dispersion of the EB-2 powder by mechanical mixing for 5 min, 2.5 mL of modifying agent was added per liter of EB-2-water mixture. The modifying agent, BN-1, is polyacrylamide, 60%, petroleum distillates 20%, alcohol, 5%, sodium chloride, 5%, and ammonium chloride, 5%.

The enhanced viscosity fluid was overlayed with a 20-fold volume of brine (7,500 mg KCl/L) at 20° C. The pressure and temperature of the enhanced viscosity fluid was measured at 10 min intervals. The data is presented in Table I and depicted graphically at FIG. 1, below.

The viscosity of the enhanced viscosity fluid was tested at the beginning of the reaction, after addition of BN-1, and one hour post addition of BN-1. These measurements were 22 cP for Initial Viscosity and 26 cP at 1 hour post addition of BN-1.

TABLE I

| Time (min) | Temp (deg C.) EB | Pressure (psi) | Comments |
|---|---|---|---|
| 10 | 21.1 | 800 | Pressure guage accurate +−5 psi |
| 20 | 20.6 | 800 | |
| 30 | 20.4 | 800 | |
| 40 | 20.5 | 800 | |
| 50 | 20.6 | 800 | |
| 60 | 20.9 | 800 | |
| 70 | 22.6 | 810 | |
| 80 | 28.4 | 810 | 70 min to hydration |
| 90 | 30.1 | 810 | |
| 100 | 30.3 | 810 | |
| 110 | 29.4 | 810 | |
| 120 | 29.2 | 810 | |
| 130 | 29.4 | 810 | |
| 140 | 27.2 | 810 | |
| 150 | 25.4 | 810 | |
| 160 | 25.1 | 800 | Reaction Complete |
| 170 | 25.1 | 800 | |
| 180 | 25.1 | 800 | |

Example 2—EB3 LCM/Mud Additive

An LCM/Mud Additive or enhanced viscosity fluid was created using EcoBust Type 3 ("EB-3"; working ambient temperatures between 41 and 59° F.). EB-3 powder was hydrated at a rate of about 1.3 g of powder per 1.0 ml of water. After dispersion of the EB-3 powder by mechanical mixing for about 5 min, 2.5 mL of modifying agent was added per liter of EB-3-water mixture. The modifying agent, BN-1, is polyacrylamide, 60%, petroleum distillates 20%, alcohol, 5%, sodium chloride, 5%, and ammonium chloride, 5%.

Figure 2:
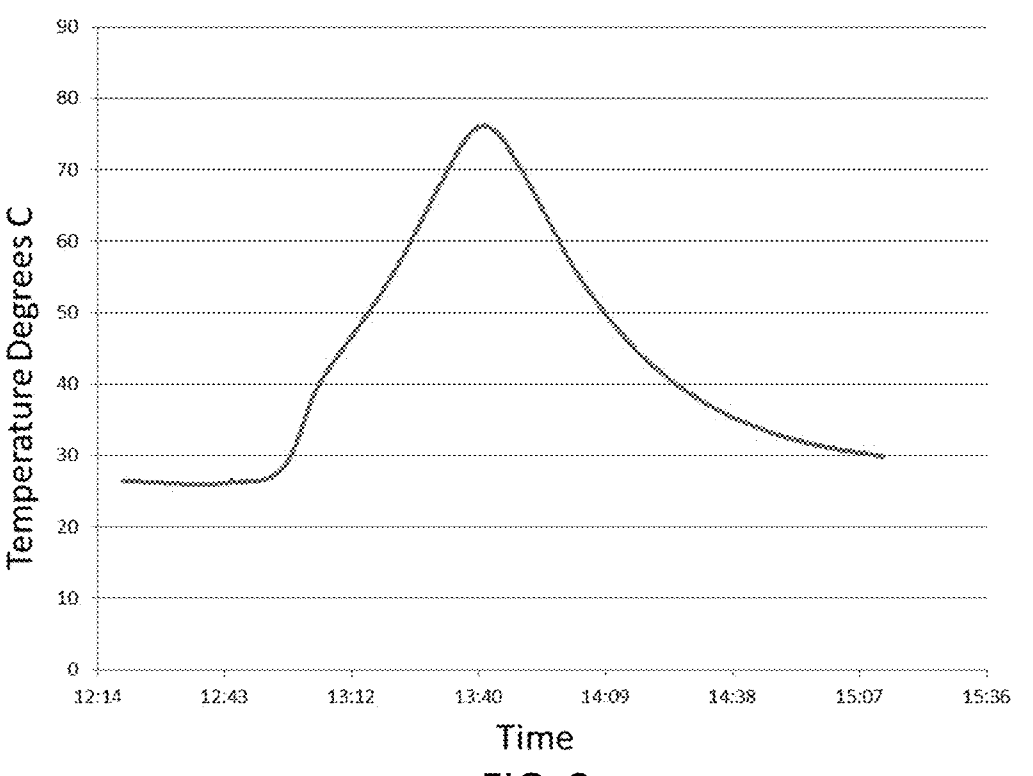
FIG. 2 shows temperature of the enhanced viscosity fluid of Example 2 as a function of time.

The temperature of the enhanced viscosity fluid was measured at 10 second intervals. The data is depicted graphically at FIG. 2 (temp vs. time), below.

Example 3—EB4 LCM/Mud Additive

An LCM/Mud Additive or enhanced viscosity fluid was created using EcoBust Type 4 ("EB-4"; working ambient temperatures between 23 and 41° F.). EB-4 powder was hydrated at a rate of about 1.3 g of powder per 1.0 ml of water. After dispersion of the EB-4 powder by mechanical mixing for about 5 min, 2.5 mL of modifying agent was added per liter of EB-4-water mixture. The modifying agent, BN-1, is polyacrylamide, 60%, petroleum distillates 20%, alcohol, 5%, sodium chloride, 5%, and ammonium chloride, 5%.

Figure 3:
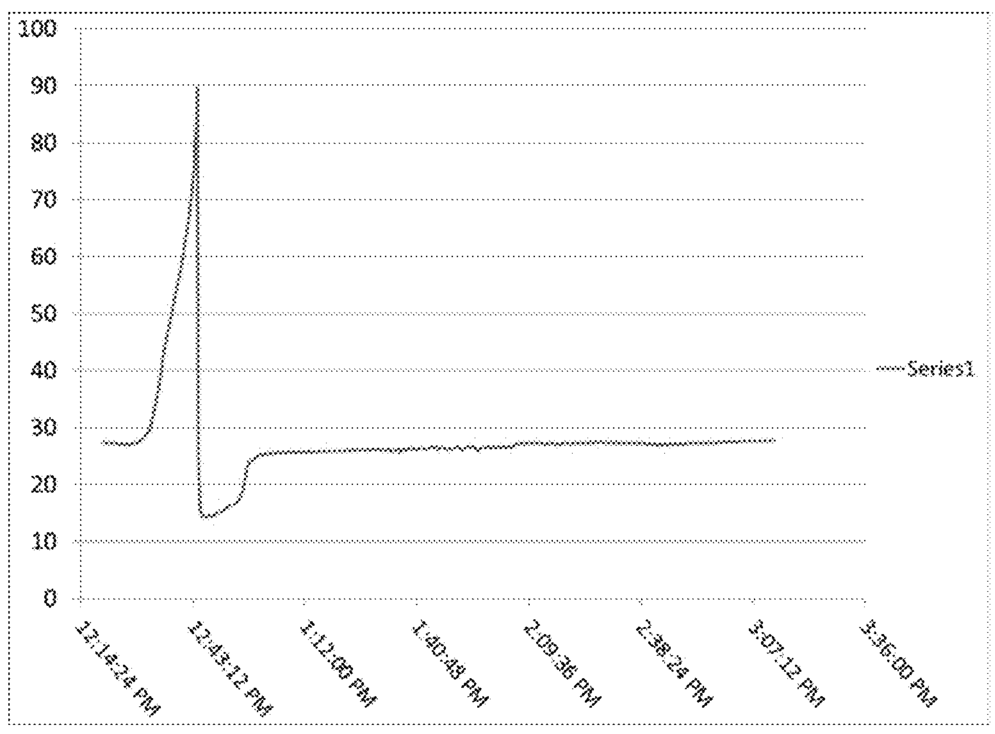
FIG. 3 shows temperature of the enhanced viscosity fluid of Example 3 as a function of time.

The temperature of the enhanced viscosity fluid was measured at 10 second intervals. The data is depicted graphically at FIG. 3 (temp vs. time), below. The temperature probe was expelled from the enhanced viscosity fluid at about 25 min, causing a sharp decline in the temperature. The reaction was essentially completed by about 35 min.

Example 4—Resin X Tubing Leak Deployment

The M1-3 well displayed positive pressure when pumping, but displayed a vacuum when pumping was stopped. Backside pressure was not evident despite the production of gas. These results characteristics may indicate the presence of a leak in the tubing string. The leak or leaks may allow the fluid within the tubing to flow into the backside when the pump is shut down. This may also result in a loss of production as the gas product escapes from the tubing.

To mitigate the potential leaks 15 gals of a mixture of 20% resin X+80% water was (1:4 resin:Water) deployed down the backside. This initial deployment was then followed by 4 gals of a mixture of 50% Resin X+50% fresh water (1:1 resin:water). Resin and water was mixed at the surface and then deployed through backside valves. After deployment of the resin+water mixture, the pump was turned on at a low rate so as to draw the Resin X down the backside into the pump and then up through the tubing. This low rate pumping was performed to allow the resin+water mixture to travel back down the tubing and through the leak into the backside. Solidification of the resin mixture would then patch the leak or leaks. For these tests, no calcium oxide catalyst was deployed.

The following day, 42 bbls was produced. On the third day, post treatment, the backside pressure measured 100 psi. Further, after the pump was shut down, the tubing no longer displayed a strong vacuum, demonstrating that the resin had successfully patched the leak(s). In the following days, the backside pressure was measured at 100 psi, and no further leaks were detected.

All references disclosed herein, whether patent or non-patent, are hereby incorporated by reference as if each was included at its citation, in its entirety.

Although the present disclosure has been described with a certain degree of particularity, it is understood the disclosure has been made by way of example, and changes in detail or structure may be made without departing from the spirit of the disclosure as defined in the appended claims.

CLAIMS

We claim:

1. A method of at least partially sealing a leak in a well, the method comprising:

identifying the leak in the well;

determining an amount of an oxidizer sufficient to seal the leak based on a size of the leak and a pressure required to move fluid through the leak, wherein the oxidizer comprises calcium oxide;

depositing the amount of the oxidizer at or near the leak;

deploying a phenolic resin to the well to contact the phenolic resin with the oxidizer; and allowing the phenolic resin to polymerize at and around the leak, wherein the polymerization occurs when the phenolic resin contacts the deposited oxidizer.

2. The method of claim 1, wherein the well is an oil, gas, or geothermal well.

3. The method of claim 2, wherein the phenolic resin polymerizes at the deposited oxidizer.

4. The method of claim 3, wherein the phenolic resin hardens to form a barrier to fluids and gases.

5. The method of claim 4, wherein the oxidizer is a component of a drilling fluid.

6. The method of claim 5, wherein the phenolic resin comprises phenol and formaldehyde in molar ratio of phenol to formaldehyde greater than 1:1.

7. The method of claim 6, wherein the phenolic resin comprises phenol and formaldehyde in a molar ratio of about 1:1 to about 10:1.

8. The method of claim 7, wherein the phenolic resin comprises phenol at less than about 17% and formaldehyde at less than about 1.7%.

9. The method of claim 8, wherein the phenolic resin is mixed with water prior to deploying into the well.

10. The method of claim 9, wherein the ratio of phenolic resin to water is 1:1 to 1:4.

11. The method of claim 10, wherein the ratio of phenolic resin to water is 1:4.

12. The method of claim 10, wherein the ratio of phenolic resin to water is 1:1.

13. The method of claim 9, wherein a first deployment of phenolic resin and water at a ratio of 1:4 is followed by a second deployment of phenolic resin and water at a ratio of 1:1.

14. The method of claim 9, wherein the well is an oil well.

15. The method of claim 9, wherein the well is a geothermal well.

16. The method of claim 9, wherein the well is a gas well.

17. The method of claim 1, wherein the depositing the oxidizer comprises pumping an oxidizer-water mixture through the leak at a constant fluid rate to deposit the amount of the oxidizer into the leak and immediately behind the leak, such that a matrix of oxidizer is created at or near the leak to allow rapid polymerization of the phenolic resin.

18. The method of claim 1, wherein:

the depositing the amount of the oxidizer comprises mixing a calcium-fluid mixture with a modifying agent to create a modifying agent-calcium-fluid mixture;

the modifying agent comprises a polymer, a hydrocarbon, an alcohol, and a salt; and the deploying the phenolic resin comprises contacting the modifying agent-calcium-fluid mixture with the phenolic resin.

19. A method of at least partially sealing a leak in a well comprising:

identifying the leak in the well;

determining an amount of an oxidizer sufficient to seal the leak based on a size of the leak and a pressure required to move fluid through the leak, wherein the oxidizer comprises calcium oxide;

depositing the amount of the oxidizer at or near the leak, the oxidizer being a component of a drilling fluid used to form the well;

deploying a phenolic resin mixed with water into the well to contact the phenolic resin with the oxidizer, at a ratio of 1:4 resin:water, wherein the phenolic resin comprises less than about 1.7% formaldehyde; and allowing the phenolic resin to polymerize at and around the leak after contacting the oxidizer, wherein the polymerization occurs when the phenolic resin contacts the oxidizer.

20. The method of claim 19, further comprising a second deployment of a phenolic resin mixed with water at a ratio of 1:1 resin:water.

* * * * *